(12) United States Patent
Zanoni et al.

(10) Patent No.: US 8,965,211 B1
(45) Date of Patent: *Feb. 24, 2015

(54) SYSTEM AND METHOD OF ANALOG TO DIGITAL CONVERSION WITHOUT PHASE AMBIGUITY

(75) Inventors: Raymond Zanoni, Columbia, MD (US); Kim S. Jepsen, Ellicott City, MD (US); Oliver S. King, Frederick, MD (US); Mark A. Laliberte, Crownsville, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 515 days.

This patent is subject to a terminal disclaimer.

(21) Appl. No.: 13/248,830

(22) Filed: Sep. 29, 2011

(51) Int. Cl.
H04B 10/00 (2013.01)
H04B 10/60 (2013.01)

(52) U.S. Cl.
CPC ...................................... H04B 10/60 (2013.01)
USPC ........... 398/115; 398/202; 398/204; 398/207; 398/208; 398/188; 341/137; 341/155; 341/144

(58) Field of Classification Search
CPC ...... H04B 10/60; H04B 10/61; H04B 10/505; H04B 10/548; H04B 10/2575; H04B 10/25759; H03M 1/12; H03M 1/00; H03M 1/06
USPC ......... 398/115, 202, 183, 188, 140, 141, 158, 398/159, 204, 207, 208; 341/137, 155, 144
See application file for complete search history.

(56) References Cited

U.S. PATENT DOCUMENTS

| | | | | |
|---|---|---|---|---|
| 5,010,346 | A * | 4/1991 | Hamilton et al. | 341/137 |
| 6,525,682 | B2 * | 2/2003 | Yap et al. | 341/137 |
| 8,442,402 | B1 * | 5/2013 | Zanoni et al. | 398/115 |
| 8,456,336 | B1 * | 6/2013 | Zanoni et al. | 341/137 |
| 8,548,331 | B1 * | 10/2013 | Zanoni et al. | 398/115 |
| 2012/0213531 | A1 * | 8/2012 | Nazarathy et al. | 398/202 |

OTHER PUBLICATIONS

U.S. Appl. No. 13/204,158, filed Aug. 5, 2011 Zanoni et al.
Clark, T.R., et al., Photonics for RF Front Ends, IEEE microwave magazine, May 2011, 9 pages.
Clark, T.R., et al., Coherent Optical Phase-Modulation Link, IEEE Photonics Technology Letters, vol. 19, No. 16, Aug. 15, 2007, 3 pages.

(Continued)

Primary Examiner — Hanh Phan
(74) Attorney, Agent, or Firm — Angel N. Gerdzhikov; Donna P. Suchy; Daniel M. Barbieri

(57) ABSTRACT

A system and method of digitizing an analog signal without an amplitude channel is disclosed. The system and method includes receiving an analog signal comprising a voltage v(t) and a frequency f1, producing a series of optical pulses at a sampling frequency f2 with a pulsed laser, splitting the series of optical pulses into a first optical signal and an optical reference signal, phase modulating the first optical signal with the analog signal to produce a sampled optical signal such that phase shifts between adjacent samples in the sampled optical signal does not exceed π radians, and receiving the sampled optical signal and the optical reference signal at a photonic signal processor.

21 Claims, 5 Drawing Sheets

(56) References Cited

OTHER PUBLICATIONS

Valley et al., Photonic Analog-to-Digital Converters: fundamental and practical limits, Integrated Optical Devices, Nanostructures, and Displays, Proceedings of SPIE, vol. 5618, 2004, 11 pages.

Valley, G.C., Photonic Analog-to-Digital Converters, A Tutorial, The Aerospace Corporation, 2009, 48 pages.

Valley, G.C., Photonic Analog-to-Digital Converters, The Aerospace Corporation, Optics Express, vol. 15, No. 5, Mar. 5, 2007, 28 pages.

Zibar, D. et al., Digital Coherent Receiver Employing Photonic Downconversion for Phase Modulated Radio-over-Fibre Links, downloaded on Aug. 2, 2010 from IEEE Xplore, 4 pages.

Zibar, D. et al., Digital Coherent Receiver for Phase-Modulated Radio-Over-Fiber Optical Links, IEEE Photonics Technology Letters, vol., 21, No. 3, Feb. 1, 2009, 3 pages.

\* cited by examiner

SYSTEM AND METHOD OF ANALOG TO DIGITAL CONVERSION WITHOUT PHASE AMBIGUITY

FIELD OF THE INVENTION

The present specification relates to improving the performance of optically interleaved electronic analog-to-digital converters (ADC) implemented in various communications systems including radio-frequency (RF) communication systems.

Military RF system designers have long been aware that wide bandwidth, high resolution ADCs enable capabilities such as wideband staring signal intelligence (SIGINT) receivers, flexible software defined radio system architectures, and Low Probability of Intercept/Low Probability of Detection (LPI/LPD) radars. Fundamental performance limits of conventional ADCs significantly constrains the potential of these and other communication systems. In communication systems that transmit continuous communication signals, such as in RF communication systems, ADC technology is crucial element of system performance. Photonic devices and subsystems provide many advantages over conventional electronic ADC's (eADC) including precision timing and wide input bandwidths. Current ADC's are only capable of digitizing continuous communication signals with bandwidths of up to 10 GHz at less than 10 effective number of bits (ENOB) resolution.

In addition, some analog signal receivers including RF analog signal receivers, encode received analog RF signals using phase modulation. Conventional analog signal receivers that encode by phase modulation also use an amplitude channel that requires an additional amplitude modulator, and amplitude eADC's to resolve phase ambiguity that results from the phase modulation process.

Therefore, there is a need for an optically interleaved electronic ADC system and method to effectively overcome conventional ADC system limitations to provide an ADC capable of achieving 10 ENOB at bandwidths above 10 GHz for military and commercial operations including but not limited to radio, digital RF memory, dynamic signal modulation and wideband cueing receivers. Additionally, achieving these results in a phase modulating receiver without an amplitude channel or the additional circuitry required to support an amplitude channel would reduce the size and cost of the receiver.

SUMMARY OF THE PREFERRED EMBODIMENTS

Embodiments of a wide band analog signal receiver that converts an analog input signal into a digital output signal without an amplitude channel is disclosed. The wide band analog signal receiver includes a receiver configured to detect an analog signal comprising a voltage v(t) and a frequency f1, a pulsed laser emitting a series of optical pulses at a sampling frequency f2 with a pulsed laser, and an optical splitter configured to split the series of optical pulses into a first optical signal and an optical reference signal. The receiver also includes a phase modulator configured to phase modulate the first optical signal with the analog signal to produce a sampled optical signal such that phase shifts between adjacent samples in the sampled optical signal does not exceed π radians and a photonic signal processor configured to receive the sampled optical signal and the optical reference signal.

Embodiments of a method of converting an analog signal into a digital signal without an amplitude channel at a receiver are disclosed. The method includes receiving an analog signal comprising a voltage v(t) and a frequency f1, producing a series of optical pulses at a sampling frequency f2 with a pulsed laser, and splitting the series of optical pulses into a first optical signal and an optical reference signal. The method also includes phase modulating the first optical signal with the analog signal to produce an optically sampled signal such that phase shifts between adjacent samples in the sampled optical signal does not exceed π radians and receiving the optically sampled signal and the optical reference signal at a photonic signal processor.

BRIEF DESCRIPTION OF THE DRAWINGS

Exemplary embodiments are hereinafter described, wherein like reference numerals refer to like elements, in which.

DETAILED DESCRIPTION OF THE PREFERRED EMBODIMENTS

Figure 1:
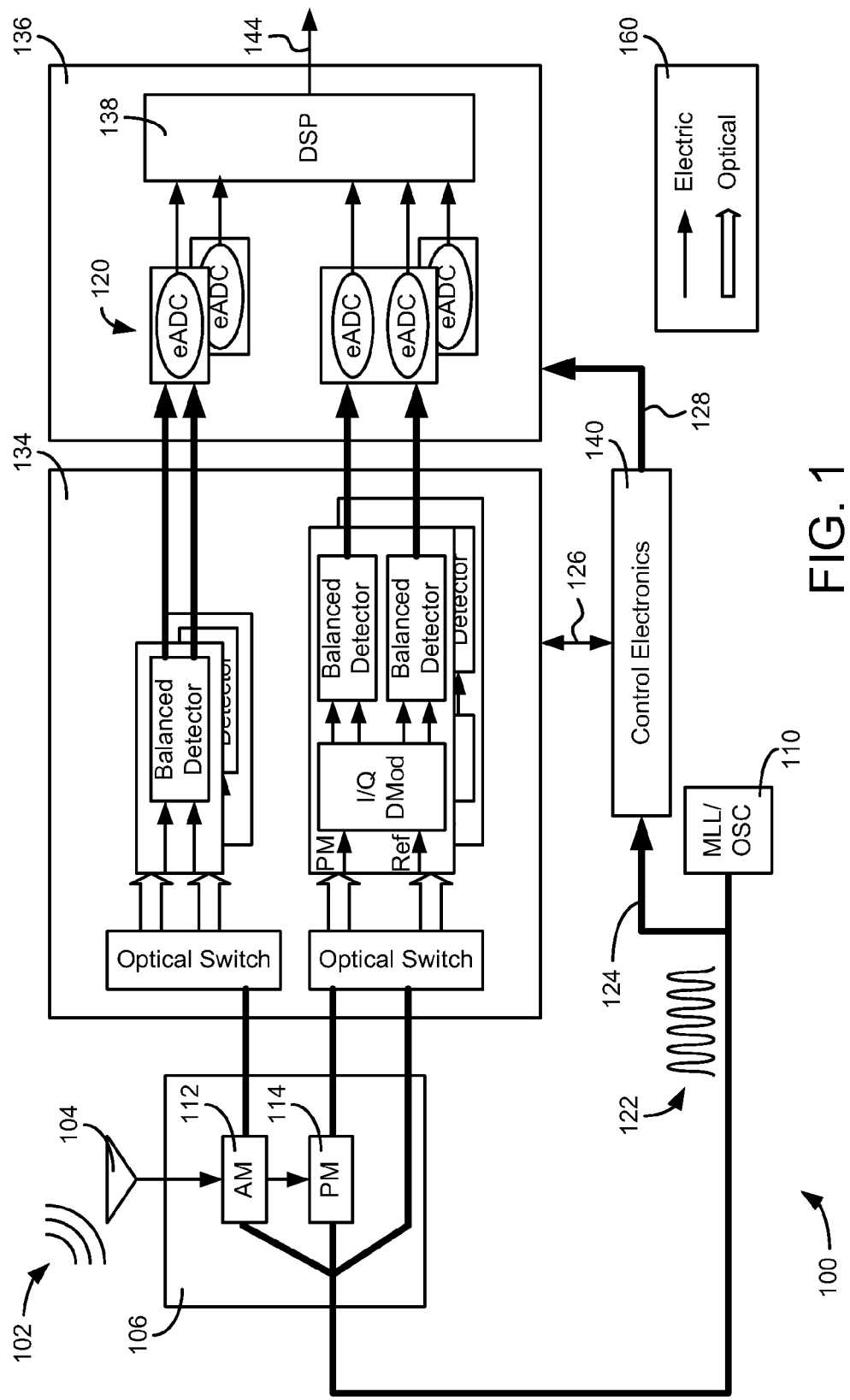
FIG. 1 is a block diagram of an optically interleaved electronic ADC that uses an amplitude channel according to an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, a receiver 100 can be used in a several applications including but not limited to military applications, medical imaging applications, radio applications, or any other commercial application (e.g., software defined radio, radio receivers capable of SIGINT operations, radar, digital RF memory, dynamic signal modulation, wideband cueing receivers, and sensor technology). Receiver 100 includes an RF antenna 104. Antenna 104 receives an analog RF signal 102 at frequencies above 10 GHz, for example. In one exemplary embodiment, the photonic processor 134 included in receiver 100 enables receiver 100 to accept and process RF signals in the W-band frequency range, from approximately 75 to 110 GHz.

The received analog signal 102 can be input directly into photonic modulation element 106 or may be down converted prior to being transmitted to modulation element 106 to reduce the frequency of received analog signal 102 to an intermediate frequency (IF). The directly received or IF analog signal has a voltage v(t) that has a sinusoidal waveform according to one embodiment, and is used as input to amplitude 112 and phase 114 modulators. The voltage v(t) is used by modulators 112 and 114 to shape the waveform of optical pulses 122 received by pulsed laser 110. According to the embodiment shown in FIG. 1, the directly received or downconverted analog signal 102 will be received by both an amplitude modulation component 112 and a phase modulation component 114. Analog signal receiver 100 is also described in further detail in U.S. patent application Ser. No. 13/204,158 entitled "Wide Band Digital receiver: System and Method," which was filed Aug. 5, 2011 and is incorporated by reference herein in its entirety.

Referring again FIG. 1, analog signal 102 with time varying voltage v(t) is sampled at photonic modulation element 106. The optically sampled signal is then optically deserialized at photonic processor 134 by the optical switches and quantized at electrical analog to digital converter (eADC) 120 and processed by a digital signal processor (DSP) 138. The eADC's 120 electronically quantize electrical signals detected by the balanced detectors shown in photonic processor 134 and transmit the quantized electrical signals to digital signal processor 138, which outputs the digital information 144 originally contained in analog signal 102 for further application specific processing. The control electronics 140 used to control the pADC 130 of the W-band receiver 100 provide on-board eADC calibration, timing control, memory, and data processing to ensure effective and proper operation of the W-band receiver 100. The control electronics 140 can be enabled by way of a PC-based applications program, such as a Labview program, which provides system level instrument control, calibration, and real time data analysis. The analysis may also include the ability to calculate a least squares fit to the digitized signal in order to determine ENOB. Also, a Fourier transform calculation may be used to determine the SFDR (as computed by the PC-based applications program).

Photonic processor 134 utilized in the wide band receiver 100 can provide a scalable architecture referred to as multi-dimensional quantization (MDQ). One technical benefit of the MDQ system and method is an ability to increase the ENOB of the photonic ADC over that of the constituent electronic ADCs. MDQ technology also increases the SFDR of the photonic ADC over that of the constituent electronic ADCs and uses optical or hybrid optical/electrical deserialization to reduce the effective sampling rate presented to each electronic ADC. MDQ systems and methods also allow for simple correction for various imperfections of the optical receiver. For example, it allows for increasing the instantaneous bandwidth (IBW) of a wide band receiver to up to 35 GHz while maintaining a resolution of around 8 ENOB. Details of some examples of such photonic processors are described in U.S. Pat. No. 7,876,246, and U.S. Pat. No. 7,868, 799, which are incorporated in their entirety herein by reference.

Referring again to FIG. 1, an analog signal 102 received by an antenna 104 is phase and amplitude encoded onto a stream of optical pulses generated by an optical laser such as a low phase noise mode locked laser (MLL) 110, for example. Performing the sampling process using phase modulated optical pulses, as contrasted to simply relaying the RF signal on a phase modulated continuous wave optical carrier to an electronic ADC for sampling, is critical. Optical sampling allows the sampling to occur using an ultra-low jitter optical pulse source 110. Without the low jitter associated with optical sampling, the above benefits cannot be realized, because the performance will be limited by the clock jitter on the clock that drives the electronic ADCs.

Alternatively, the amplitude modulator (AM) can be provided with an input directly from a mixer or low noise amplifier (LNA) instead of from the antenna 104. The resultant optical pulses are demodulated on three separate channels including In-phase (I) and Quadrature (Q) data resulting from optical hybrid I/Q demodulation of signals from the optical phase modulator 114 and the un-modulated channel in optical modulation element 106, and amplitude data transmitted from optical amplitude modulator 112. One purpose of photonic processor 134 is to deserialize the sampled analog signal 102 with optical switches such that each of the three separate channels may be provided in parallel prior to being converted to electrical signals to effectively overcome the limitations of the relatively low speed photodiodes and electrical quantizers. Accordingly, the collective sampling rate of electrical quantization element 136 can be greatly increased depending on the number of parallel paths and the particular configuration of elements 134 and 136.

In the embodiment shown in FIG. 1, the optical switches provided on the I, Q, and amplitude channels time deinterleave each channel to by providing serial to parallel conversion in each optical channel according to timing signals derived from the optical pulse train from MLL 110. At modulation element 106, an optical signal from laser 110 is provided to amplitude modulator 112 to create a separate amplitude channel which is used by electrical quantizer 136 to remove any phase ambiguity introduced into the phase modulated signal in cases where the phase modulator 114 is driven through more than one $2\pi$ phase rotation. The concept of phase ambiguity in the context of I/Q demodulation is discussed in detail with respect to FIG. 3 and FIG. 5.

Figure 2:
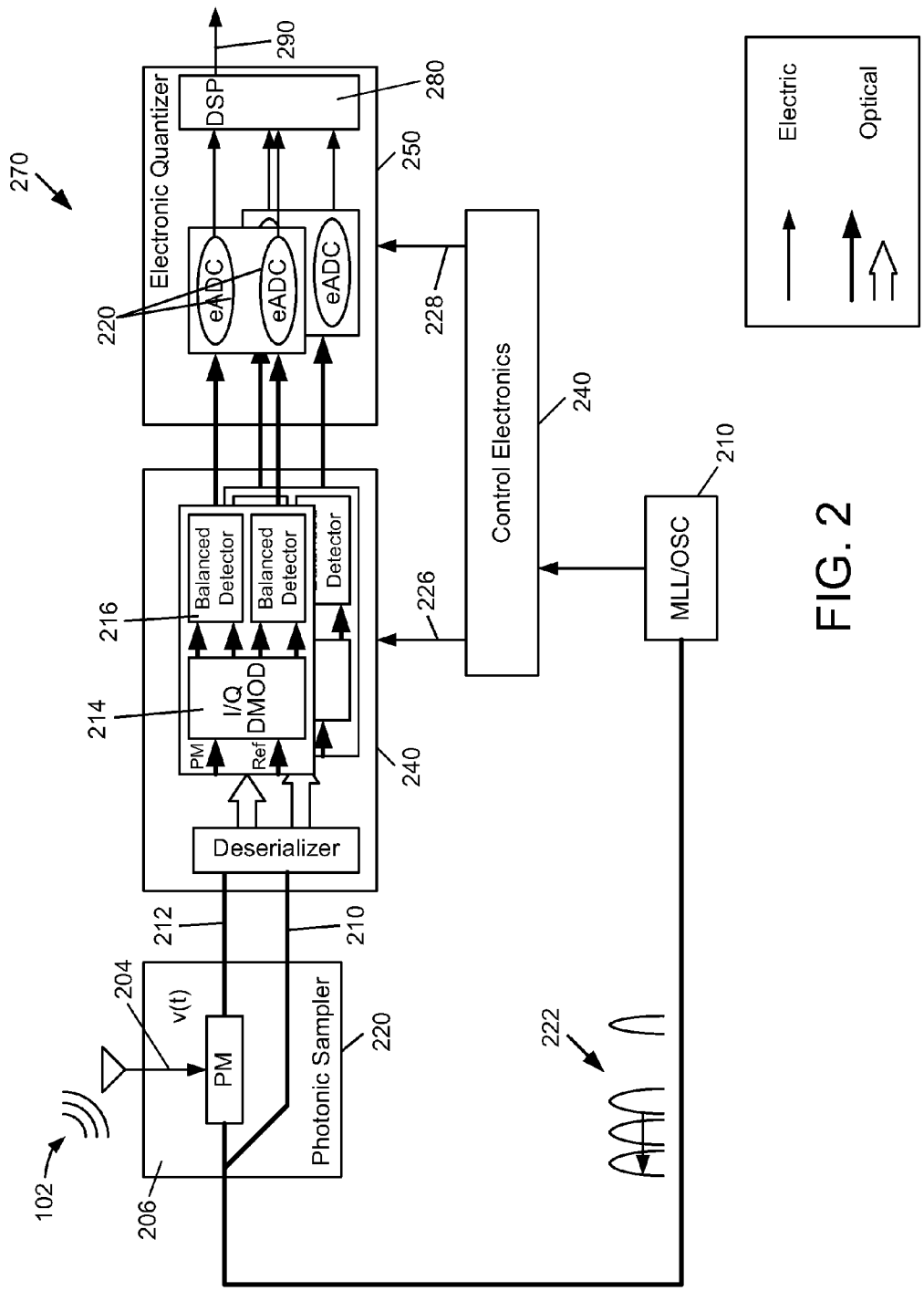
FIG. 2 is a block diagram of an optically interleaved electronic ADC that does not include an amplitude channel according to an exemplary embodiment.
Figure 3:
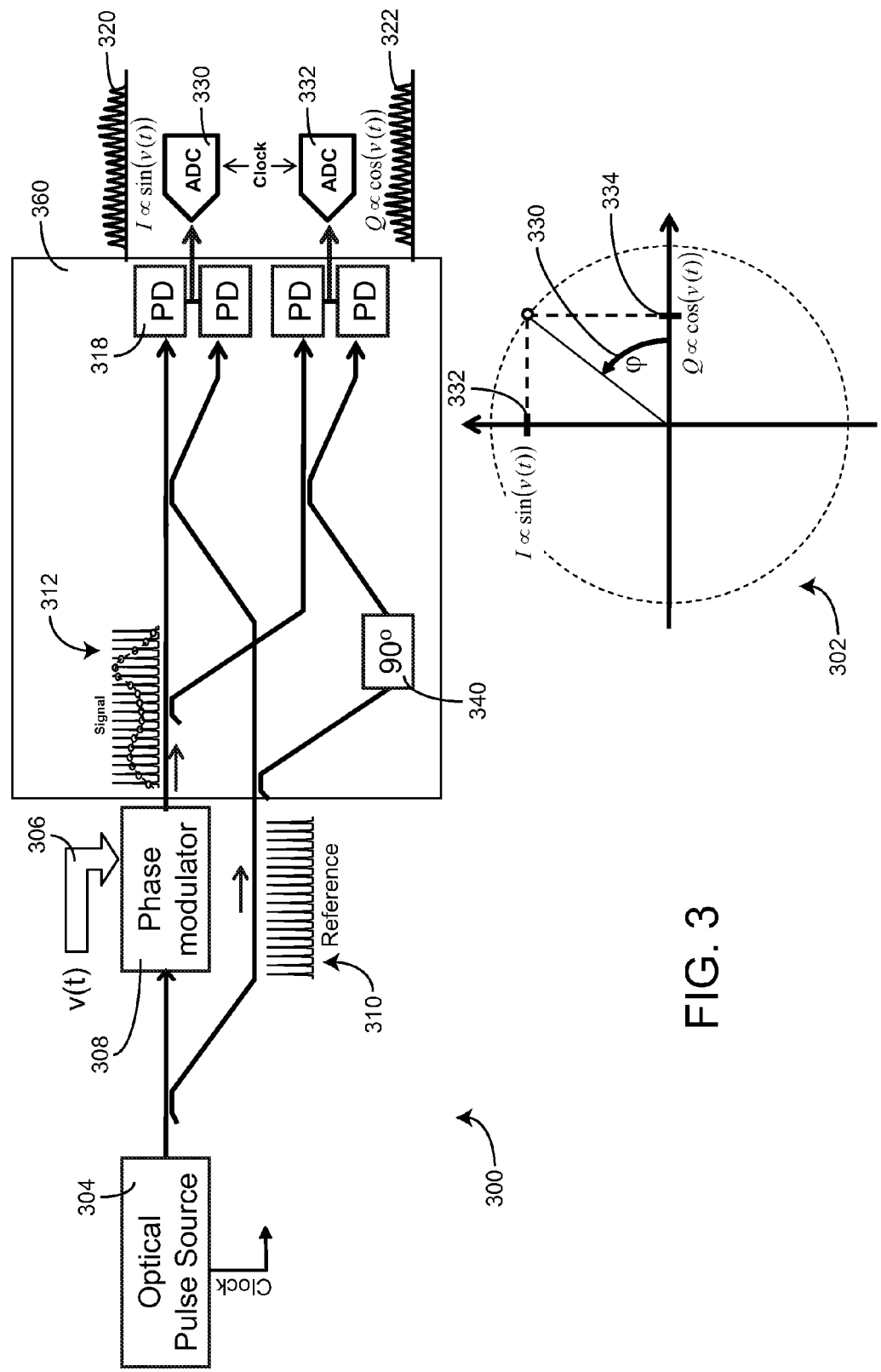
FIG. 3 is a simplified diagram of an analog signal receiver that does not include an amplitude channel and an I/Q signal diagram.

FIG. 3 depicts a simplified analog signal receiver 300 including a microwave sampler that does not include an amplitude channel as well as an I/Q signal diagram 302. The simplified receiver 300 can be applied to the analog signal receiver of shown FIG. 2 that includes optical interleaving in a photonic processor, 240 but can included many other types of analog signal receiver. Specifically, signal v(t) 306 phase modulates the series of optical pulses from laser 304 passing through the phase modulator 308 such that only the phase of the optical pulses are changed. The phase modulated signal is then demodulated at I/Q demodulator 360 using reference signal 310, also provided by laser 304.

At I/Q demodulator 360, the in phase I signal, which is proportional to sin [v(t)], is detected by photodectors 318 to produce electrical signal 320. Furthermore, the quadrature Q signal is phase shifted 90 degrees at element 340 in I/Q demodulator 360 such that it is proportional to cos [v(t)]. When Q signal 310 is detected by photodetectors 318, electrical signal 322 is produced. Polar coordinate system 302 graphically depicts the relationship between the Q signal 322 (shown as an extension from x axis 334) and I signal 320 (shown as an extension from y axis 332). The outputs from the I/Q demodulator 360 may be depicted in two dimensional I/Q space 302.

In the simplified system 300, the amplitude of the vector shown in I/Q space 302 remains constant because phase modulator 308 only alters the phase of the optical pulses from laser 304 rather than amplitude. However, phase angle φ 330 changes as a result of the differences between signal 320 and signal 322, causing the displayed vector to spin about I/Q space 302 in a manner proportional to the phase modulation applied at phase modulator 308. Accordingly, the phase angle 330 is proportional to the voltage v(t) 306 applied to the phase modulator 308 and so can be used to determine the received signal v(t).

Because the phase angle 330 is proportional to any received voltage v(t), the phase angle 330 may rotate any number of times about I/Q space 302 comprising 360 degrees of rotation, or 2π radians of rotation. When phase angle 330 is limited to 2π radians of rotation, the corresponding voltage can be determined mathematically by taking the arctangent of the detected I signal 320 (approximated as a sine wave) divided by the Q signal 322 (approximated as a cosine wave), for example. However, if the phase angle exceeds 2π radians of rotation, a single phase angle will correspond to two different input voltages v(t) 306 causing phase ambiguity. Phase ambiguity of this kind is depicted in I/Q graph 502. As seen in 502, when phase angle 502 exceeds 2π radians of rotation, the phase only provides a single vector coordinate, resulting in phase ambiguity.

Figure 5:
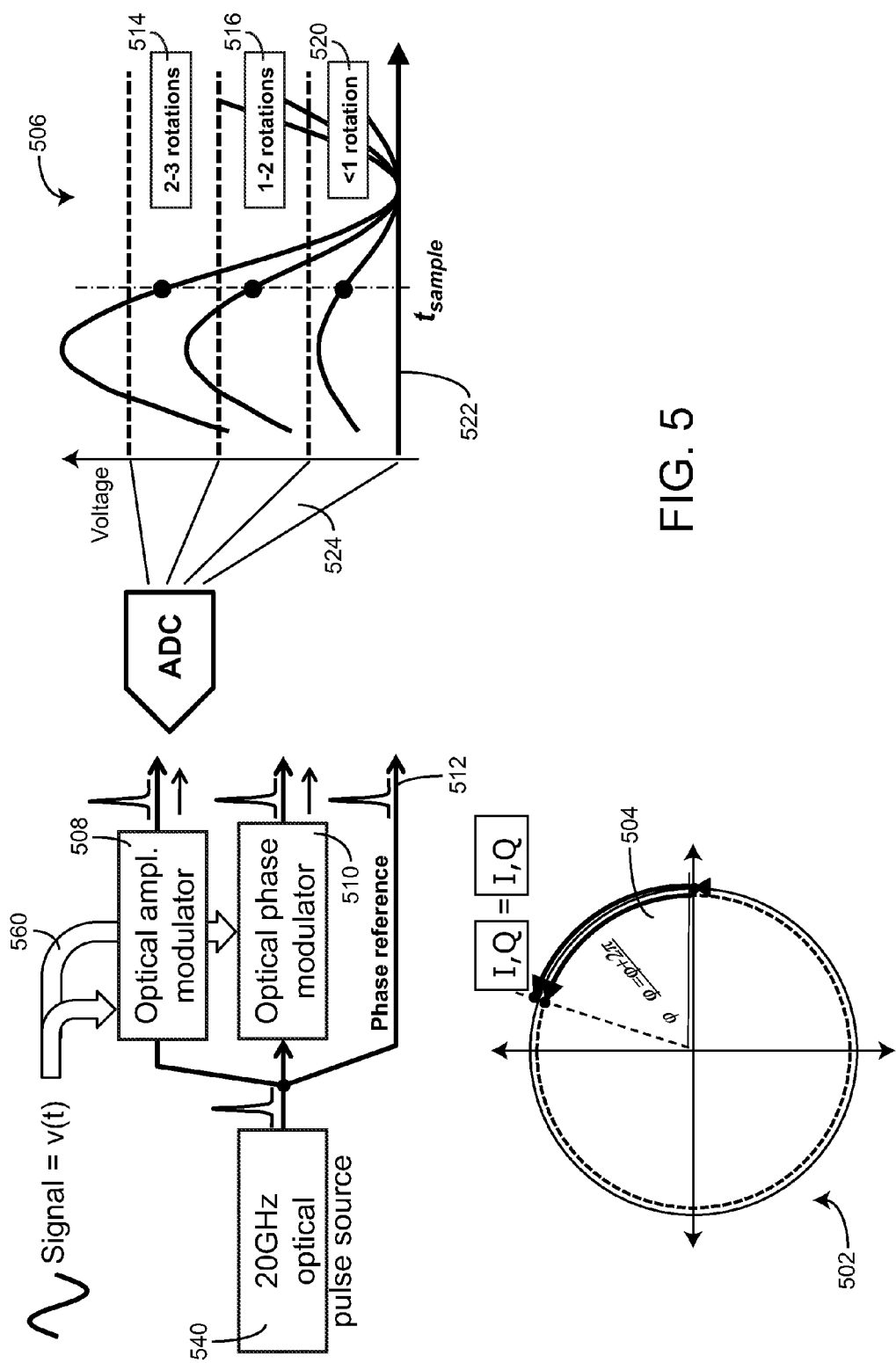
FIG. 5 is a simplified block diagram of an analog signal receiver that does include an amplitude channel and an I/Q signal diagram.

Some analog signal receiver systems 100 have resolved phase ambiguity by counting each 2π radian phase rotation by using an additional amplitude channel 112 as shown in a simplified analog signal receiver depicted in FIG. 5. Receiver systems 100 keep track and distinguish between 2π phase rotations by detecting the amplitude of the analog signal v(t) as shown by graph 506, which depicts the input voltage v(t) at three different levels 514, 516, and 520 and each voltage levels respective phase rotation.

However, according to one disclosed embodiment as shown in FIG. 2 and FIG. 3, the phase ambiguity that results from the phase angle 330 exceeding 2π radians of rotation is resolved in another manner. According to one embodiment, analog input signal 306 is a sinusoidal signal with a frequency f1 and a peak to peak voltage of V2 while phase modulator 206 requires a voltage of V1 to induce a π phase rotation and laser 210 has a sampling frequency f2. By setting variables such as the peak to peak voltage (V2) and frequency (f1) of received analog signal v(t) 306, as well as the sampling frequency (f2) of laser 210 and the amount of voltage (V1) required by phase modulator 206 to induce a π phase rotation, the resulting phase angle rotation can be limited to a rotation of 2π radians or less, thereby eliminating phase ambiguity and the need for an amplitude phase tracking channel.

According to one exemplary embodiment, the following equations ensure that the resulting phase angle rotation 330 is limited to a rotation of 2π radians or less. As stated previously, phase modulator 308 and I/Q demodulator 214 cause the phase angle at any given time, φ(t) to be equal to the received analog voltage v(t) at any given time such that equation (1) holds true. Furthermore, the characteristics of phase modulator 308 will dictate the value of a voltage V1 required to induce a π radian phase rotation such that equation (2) is also true. Additionally, because v(t) is a sinusoidal signal with a frequency f1 and a peak to peak voltage of V2, according to one embodiment, equation (3) is equivalent to equation (2), wherein t is the time between optical samples, or equivalently the inverse of the sampling rate, f2.

$$\phi(t) = v(t) \quad (1)$$

$$\varphi(t) = \frac{\pi}{V1} v(t) \quad (2)$$

$$\varphi(t) = \frac{\pi}{V1} \left( \frac{V2}{2} \sin[2\pi \cdot f2 \cdot t] \right) \quad (3)$$

Furthermore, because each voltage V1 that results in a π radian phase rotation must be less than or equal to a π radian phase rotation to ensure that no voltage corresponds to a radian phase rotation greater than 2π, equation (4) must also result. Replacing t with the inverse of the sampling rate, f2 results in equation (5).

$$\frac{\pi}{V1} \left( \frac{V2}{2} \sin[2\pi \cdot f2 \cdot t] \right) \leq \pi \quad (4)$$

$$\sin\left[\pi\left(\frac{f1}{f2}\right)\right] \leq \left(\frac{2V1}{V2}\right) \quad (5)$$

Accordingly, if the analog signal receiver depicted in FIG. 2 is designed such that equation (5) holds true, the resulting phase angle rotation can be limited to a rotation of 2π radians or less, thereby eliminating phase ambiguity and the need for an amplitude phase tracking channel. For example, using equation (5) as a guide, if laser 210 is set to oscillate such that optical pulse stream 222 has a sampling rate of 20 Gs/s or frequency of 20 Ghz, phase modulator 206 is selected such that a 2 volt signal induces a π phase rotation, and that input analog signal 102 has a peak to peak voltage of 16 volts, the analog signal receiver shown in FIG. 2 can accept analog input signals with frequencies up to 1.6 GHz and will be able to accurately detect analog signal 102 without phase ambiguity and without the need for an amplitude channel 112 as shown in FIG. 1. Furthermore, using equation (5) as a guide, the analog signal receiver shown in FIG. 2 can be designed to accept any number of maximum input frequencies.

Referring to the general operation of the analog signal receivers depicted in FIG. 2, the performance of the photonic processor 134 is determined by the low phase noise of the pulsed laser 110 while the aperture window is defined by the optical pulse width that samples the RF waveform 102 at the phase modulator 114. With respect to phase noise, a MLL 110 provides better performance than by using a continuous wave (CW) laser as it produces an optical pulse train with lower jitter and higher resolution rate optical pulses. A photonic sampling element 106, encodes the analog signal 102 onto the phase and amplitude of the optical pulse stream. A photonic processor 134 contains components for optical deserialization, I/Q demodulation, and optical to electrical detection.

An electronic quantization stage 136, also referred to herein as a digitizer, includes multiple eADC's 220 per optical channel, with associated calibration, memory and processing functionality according to one exemplary embodiment. The number of eADC's per electrical channel, such as two, four, five, or more, may be utilized in the digital platform while remaining within the spirit and scope of the invention. According to one embodiment the number of eADC's is dependent on the number of time deinterleaved channels that are implemented at the optical switches shown in photonic processor 134. In addition, control electronics 140 are functionally connected to photonic processor 134 and electronic quantizer 136 to incorporate the various processes disclosed herein and to provide overall system management. Control electronics 140 may comprise at least one processor and at least one memory so that the control electronics processor can carry out instructions stored in the memory.

Referring to FIG. 2, optical pulse train 222 emitted from MLL 210 at a predetermined rate such as 20 Gs/s is provided to an optical splitter. At the splitter the energy of optical pulse train 222 is split between the two output ports, one optical signal 206 optically samples analog signal 204 at phase modulator 228 at a rate of 20 Gs/s while one optical signal 210 remains un-modulated as a reference signal. According to other embodiments, splitter divides optical pulse stream 222 into three separate channels, with a third channel being sent to an amplitude modulator as in FIG. 1.

Referring again to FIG. 2, after phase modulation by the RF or other analog signal 102 with a voltage v(t), the optical phase modulated signal 212 and optical reference signal 210 are optionally sent to a deserializer which may include optical switches for phase modulated signals 212 and for reference signals 210 that are both controlled by a common timing signal derived from laser 210. Each optical switch can be a lithium niobate switch, such as one made by E-O Space Inc., according to one exemplary embodiment.

Figure 4A:
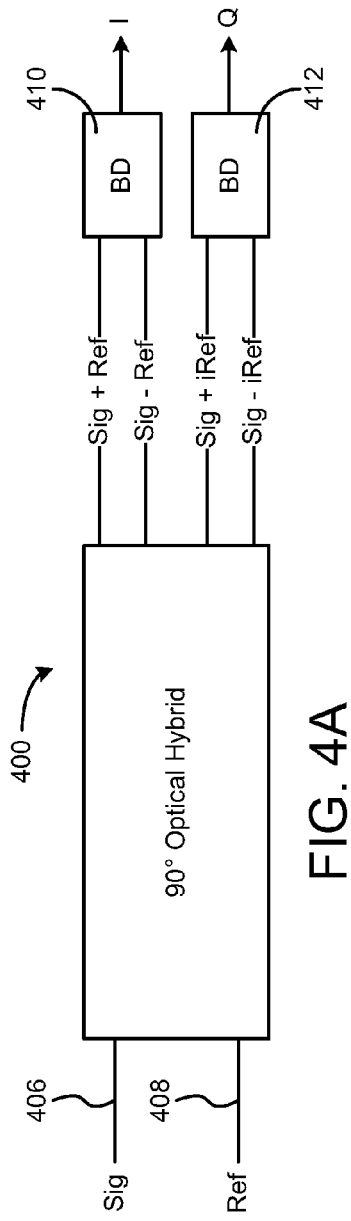
FIG. 4A is a block diagram of a demodulator used in the photonic processor according to one exemplary embodiment.
Figure 4B:
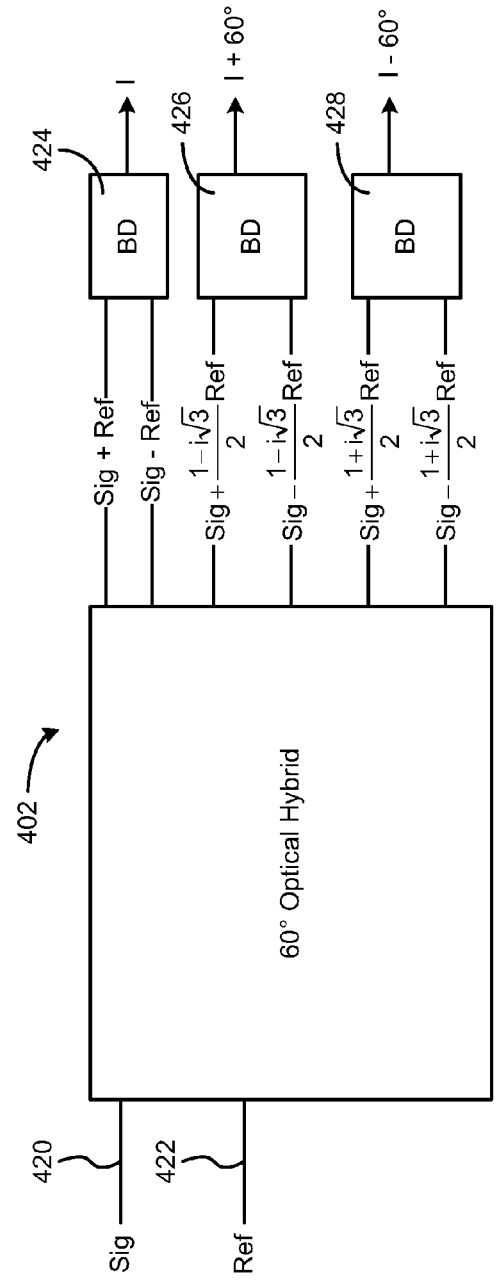
FIG. 4B is a block diagram of a demodulator used in the photonic processor according to another exemplary embodiment.

In both FIG. 1 and FIG. 2, I/Q demodulators, shown in greater detail in FIGS. 4A and 4B, will receive de-interleaved phase modulated and reference optical signals with a reduced sampling rate. Each of the I/Q demodulators 214 may be a 90° optical hybrid demodulator shown as element 400 in FIG. 4A with two balanced photodetectors 410 and 412 to convert the received optical signals into electrical I and Q signals. I/Q demodulators 400 may be demodulators such as ones made by Optoplex, Inc. However, the I/Q demodulators are not limited to 90° optical hybrid demodulators and may include 60° demodulators or any other variation of an I/Q demodulator. Each balanced photodetector 410, 412, 424, 426, and 428 can be a InP, 20 GHz bandwidth balanced photodetector, such as one made by U$^2$T Inc. Other commercially available switches, I/Q demodulators, and balanced photodetectors may be used in the receiver 100 as shown in FIG. 1, while remaining within the spirit and scope of the invention. By using such devices in a preferred implementation of the first embodiment, receiver 100 is well suited for heterogeneous Si/InP chip scale integration, which is highly desirable for military and other applications that require durable and long-lasting components.

Once the optical I and Q channel signals have been converted to analog electrical signals by the balanced photodetectors, the electrical signals are quantized by eADC's 220 as shown in FIG. 2 at a rate determined by the clock frequency 228 provided by timing control electronics 240.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Also, receiver 100 may be implemented in a wide band RF stage system or any other type of high-frequency band receiver, such as receivers operating in the 70 GHz to 200 GHz and up range. Various changes may be made to the details disclosed without departing from the spirit of the invention which is defined by the following claims.

What is claimed is:

1. A method of converting an analog signal into a digital signal without an amplitude channel at a receiver comprising:
    receiving an analog signal having a voltage v(t) and a frequency f1;
    producing a series of optical pulses at a sampling frequency f2 with a pulsed laser;
    splitting the series of optical pulses into a first optical signal and an optical reference signal;
    phase modulating the first optical signal with the analog signal to produce an optically sampled signal such that phase shifts between adjacent samples in the optically sampled signal do not exceed π radians; and
    receiving the optically sampled signal and the optical reference signal at a photonic signal processor, wherein the voltage v(t) has a peak to peak voltage V1 and the phase modulating requires a voltage V2 to phase shift the optically sampled signal by π radians, wherein the phase modulating operates under the condition that $$\sin\left[\pi\left(\frac{f1}{f2}\right)\right] \leq \left(\frac{2V1}{V2}\right).$$

2. A method of converting an analog signal into a digital signal without an amplitude channel at a receiver, the method comprising:
    receiving an analog signal having a voltage v(t) and a frequency f1;
    producing a series of optical pulses at a sampling frequency f2 with a pulsed laser;
    splitting the series of optical pulses into a first optical signal and an optical reference signal;
    phase modulating the first optical signal with the analog signal to produce an optically sampled signal such that phase shifts between adjacent samples in the optically sampled signal do not exceed π radians;
    receiving the optically sampled signal and the optical reference signal at a photonic signal processor; and
    producing a plurality of timing signals based on the series of optical pulses;
    receiving the optically sampled signal and at least one of the plurality of timing signals at one of a plurality of optical signal switches to time deinterleave the optically sampled signal into a first time deinterleaved optically sampled signal and a second time deinterleaved optically sampled signal; and
    receiving the optical reference signal and at least one of the plurality of timing signals at one of a plurality of optical reference switches to time deinterleave the optical reference signal into a first time deinterleaved optical reference signal and a second time deinterleaved optical reference signal.

3. The method of claim 2, further comprising:
    converting the optically sampled signal into at least one electrical signal; and
    sending the at least one electrical signal to an electronic analog-to-digital converter to produce a digitized electrical signal.

4. The method of claim 2, wherein the analog signal is a radio-frequency (RF) signal.

5. The method of claim 2, wherein the photonic signal processor is an optical demodulator.

6. The method of claim 5, wherein the optical demodulator is an I/Q demodulator that outputs an in-phase signal and a quadrature signal based on the optically sampled signal and the optical reference signal.

7. The method of claim 2, wherein the voltage v(t) has a peak to peak voltage V1 and the phase modulating requires a voltage V2 to phase shift the optically sampled signal by π radians.

8. The method of claim 2, wherein the optically sampled optical signal is converted into at least one electrical signal using a balanced photodetector.

9. The method of claim 8, wherein each of the balanced photodetectors receive a timing signal.

10. The method of claim 2, wherein the receiver does not include an amplitude modulator.

11. The method of claim 2, wherein the voltage v(t) has a peak to peak voltage V1 and the phase modulator requires a voltage V2 to phase shift the sampled optical signal by π radians and wherein the phase modulating operates under the condition that $$\sin\left[\pi\left(\frac{f1}{f2}\right)\right] \le \left(\frac{2V1}{V2}\right).$$

12. A wide band analog signal receiver that converts an analog input signal into a digital output signal without an amplitude channel, the wide band analog signal receiver comprising:
   a receiver configured to detect an analog signal having a voltage v(t) and a frequency f1;
   a pulsed laser emitting a series of optical pulses at a sampling frequency f2;
   an optical splitter configured to split the series of optical pulses into a first optical signal and an optical reference signal;
   a phase modulator configured to phase modulate the first optical signal with the analog signal to produce a sampled optical signal such that phase shifts between adjacent samples in the sampled optical signal do not exceed π radians; and
   a photonic signal processor configured to receive the sampled optical signal and the optical reference signal, wherein the voltage v(t) has a peak to peak voltage V1 and the phase modulator requires a voltage V2 to phase shift the sampled optical signal by π radians, wherein the phase modulator operates under the condition that $$\sin\left[\pi\left(\frac{f1}{f2}\right)\right] \le \left(\frac{2V1}{V2}\right).$$

13. The wide band analog signal receiver of claim 12, further comprising:
   an optical-to-electrical converter configured to convert the sampled optical signal into at least one electrical signal; and
   and analog-to-digital converter configured to digitize the at least one electrical signal.

14. The wide band analog signal receiver of claim 12, wherein the analog signal is a radio-frequency (RF) signal.

15. The wide band analog signal receiver of claim 12, wherein the photonic signal processor is an optical demodulator.

16. The wide band analog signal receiver of claim 15, wherein the optical demodulator is an I/Q demodulator that outputs an in-phase optical signal and a quadrature optical signal based on the received sampled optical signal and the received optical reference signal.

17. A wide band analog signal receiver that converts an analog input signal into a digital output signal without an amplitude channel, the wide band analog signal receiver comprising:
   a receiver configured to detect an analog signal having a voltage v(t) and a frequency f1;
   a pulsed laser emitting a series of optical pulses at a sampling frequency f2;
   an optical splitter configured to split the series of optical pulses into a first optical signal and an optical reference signal;
   a phase modulator configured to phase modulate the first optical signal with the analog signal to produce a sampled optical signal such that phase shifts between adjacent samples in the sampled optical signal do not exceed π radians;
   a photonic signal processor configured to receive the sampled optical signal and the optical reference signal;
   a timing signal generator for producing a plurality of timing signals based on the series of optical pulses;
   an optical signal switch that receives the sampled optical signal and at least one of the plurality of timing signals to time deinterleave the sampled optical signal into a first time deinterleaved optically sampled signal and a second time deinterleaved optically sampled signal; and
   an optical reference switches that receive the optical reference signal and at least one of the plurality of timing signals to time deinterleave the optical reference signal into a first time deinterleaved optical reference signal and a second time deinterleaved optical reference signal.

18. The wide band analog signal receiver of claim 17, wherein the voltage v(t) has a peak to peak voltage V1 and the phase modulator requires a voltage V2 to phase shift the sampled optical signal by π radians.

19. The wide band wide band analog signal receiver of claim 17 further comprising:
   an optical-to-electrical converter configured to convert the sampled optical signal into at least one electrical signal; and
   and analog-to-digital converter configured to digitize the at least one electrical signal, wherein the optical-to-electrical converter is a balanced photodetector.

20. The wide band wide band analog signal receiver of claim 17, wherein the receiver does not include an amplitude modulator.

21. The wide band wide band analog signal receiver of claim 17, wherein the voltage v(t) has a peak to peak voltage V1 and the phase modulator requires a voltage V2 to phase shift the sampled optical signal by π radians, and wherein the phase modulator operates under the condition that $$\sin\left[\pi\left(\frac{f1}{f2}\right)\right] \le \left(\frac{2V1}{V2}\right).$$

* * * * *